United States Patent
Park et al.

(10) Patent No.: US 8,110,170 B2
(45) Date of Patent: Feb. 7, 2012

(54) CONDUCTIVE POLYMER-CARBON NANOTUBE COMPOSITE AND MANUFACTURING METHOD THEREOF

(75) Inventors: Yung-Woo Park, Gangnam-gu (KR); Johannes Steinmetz, Kwanak-Gu (KR)

(73) Assignee: SNU R&DB Foundation, Seoul (KR)

( * ) Notice: Subject to any disclaimer, the term of this patent is extended or adjusted under 35 U.S.C. 154(b) by 334 days.

(21) Appl. No.: 12/442,300

(22) PCT Filed: Sep. 21, 2007

(86) PCT No.: PCT/KR2007/004663
§ 371 (c)(1),
(2), (4) Date: Apr. 3, 2009

(87) PCT Pub. No.: WO2008/035951
PCT Pub. Date: Mar. 27, 2008

(65) Prior Publication Data
US 2009/0242850 A1 Oct. 1, 2009

(30) Foreign Application Priority Data
Sep. 22, 2006 (KR) ........................ 10-2006-0092323

(51) Int. Cl.
*C01B 31/00* (2006.01)
*B01J 8/00* (2006.01)
*H01B 1/00* (2006.01)

(52) U.S. Cl. ............. 423/445 B; 423/445 R; 423/447.7; 252/500; 252/502; 252/510; 252/511; 977/700; 977/742; 977/743; 977/744; 977/750; 977/752; 977/753; 977/842; 977/846; 977/882

(58) Field of Classification Search .......... 252/500–511; 423/445 B, 445 R, 447.7; 977/700, 742, 977/743, 744, 750, 752, 753, 842, 846, 882
See application file for complete search history.

(56) References Cited

U.S. PATENT DOCUMENTS

| 6,528,572 | B1 | 3/2003 | Patel et al. |
| 2008/0265219 | A1* | 10/2008 | Whitehead et al. ........... 252/511 |
| 2009/0202644 | A1* | 8/2009 | Gogotsi et al. ................ 424/489 |

FOREIGN PATENT DOCUMENTS

| KR | 1020050051939 A | 5/2005 |
| KR | 1020050075858 A | 6/2005 |

(Continued)

OTHER PUBLICATIONS

Sun et al. (Fabrication of Ruthenium-carbon nanotube nanocomposites in supercritical water. Adv. Mater. 17(7), pp. 928-932, Apr. 4, 2005).*

(Continued)

*Primary Examiner* — Mark Kopec
*Assistant Examiner* — Tri V Nguyen
(74) *Attorney, Agent, or Firm* — Sherr & Vaughn, PLLC

(57) ABSTRACT

Provided are a conductive polymer-carbon nanotube composite including a carbon nanotube and a conductive polymer filled therein, and a method of manufacturing the same. The conductive polymer-carbon nanotube composite where a conductive polymer is filled in a carbon nanotube is manufactured by introducing a monomer of the conductive polymer into the carbon nanotube using a supercritical fluid technique and polymerizing the monomer. The conductive polymer-carbon nanotube composite is a novel nano-structure material which can overcome limitations that conventional materials may have, and thus can be applied to various applications such as sensors, electrode materials, nanoelectronic materials, etc.

11 Claims, 3 Drawing Sheets

FOREIGN PATENT DOCUMENTS

KR        100610888 B    8/2006

OTHER PUBLICATIONS

Ye et al. (Supercritical fluids fabrication of metal nanowires and nanorods templated by multiwalled carbon nanotubes. Adv Mater 15(3), p. 316-319, Feb. 5, 2003).*

McIntosh et al. (Energetics and electronic structure of a polyacetylene chain contained in a carbon nanotube. Phys Rev. B, 67, 125419-1/5, Mar. 24, 2003).*

Wang et al. (Poly(N-vinyl carbazole)-functionalized single-walled carbon nanotubes: Synthesis, characterization, and nanocomposite thin films. Polymer, 46, p. 8634-8640, Aug. 15, 2005).*

Steinmetz et al. (Polymerization of conducting polymers inside carbon nanotubes. Chem PHys Let, 431, p. 139-144, Sep. 26, 2006).*

* cited by examiner

[Fig. 1]
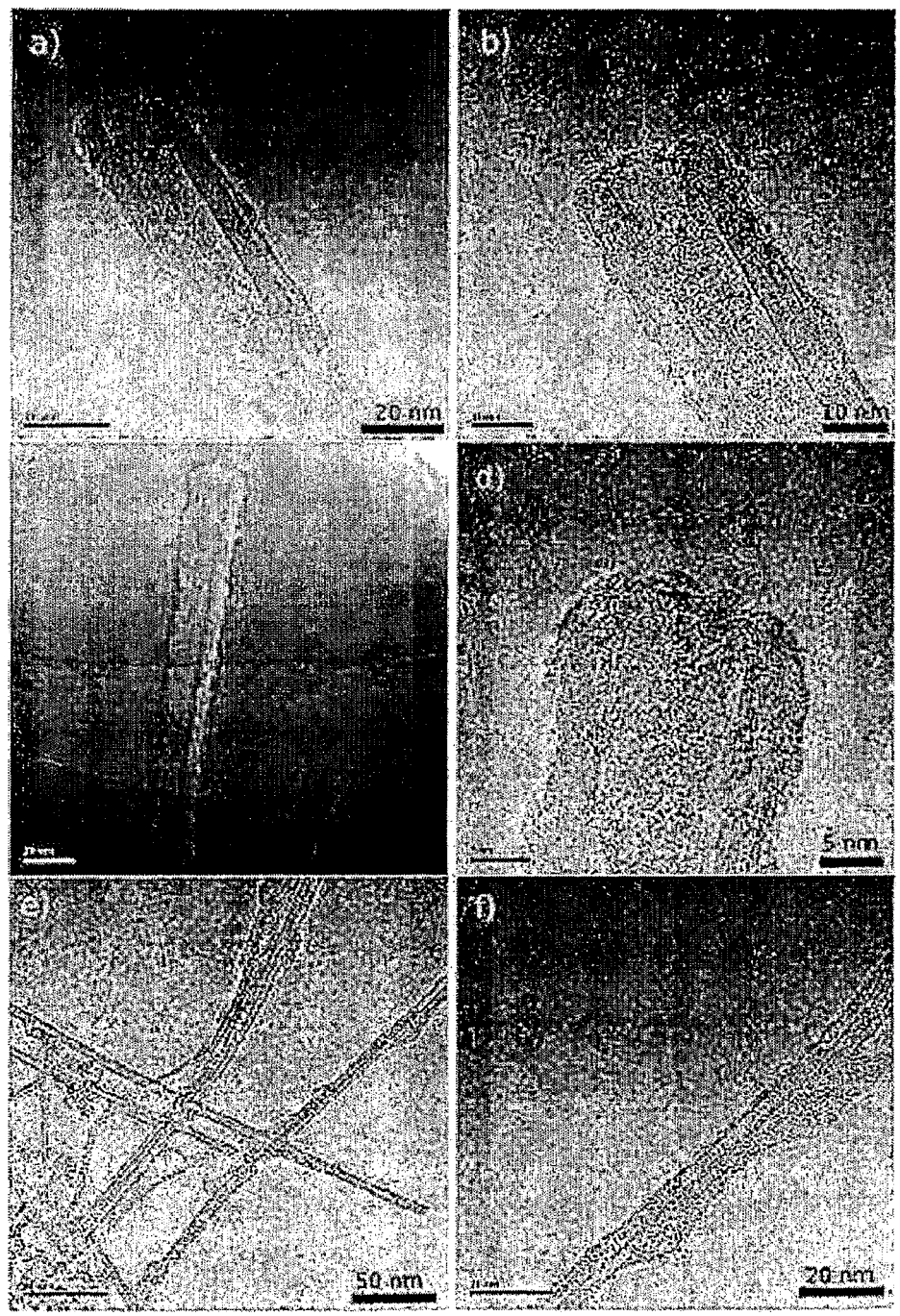

[Fig. 2]
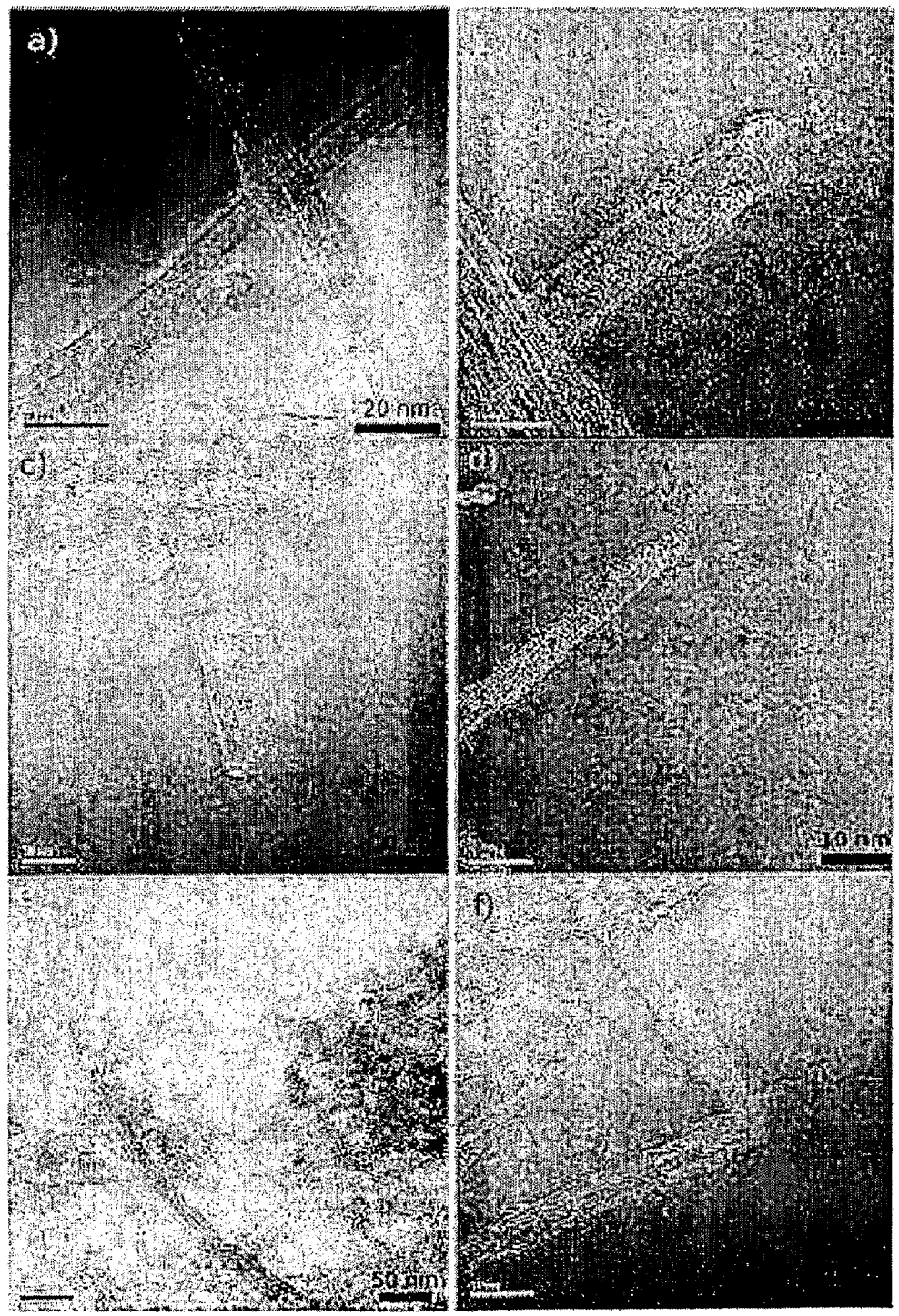

[Fig. 3]
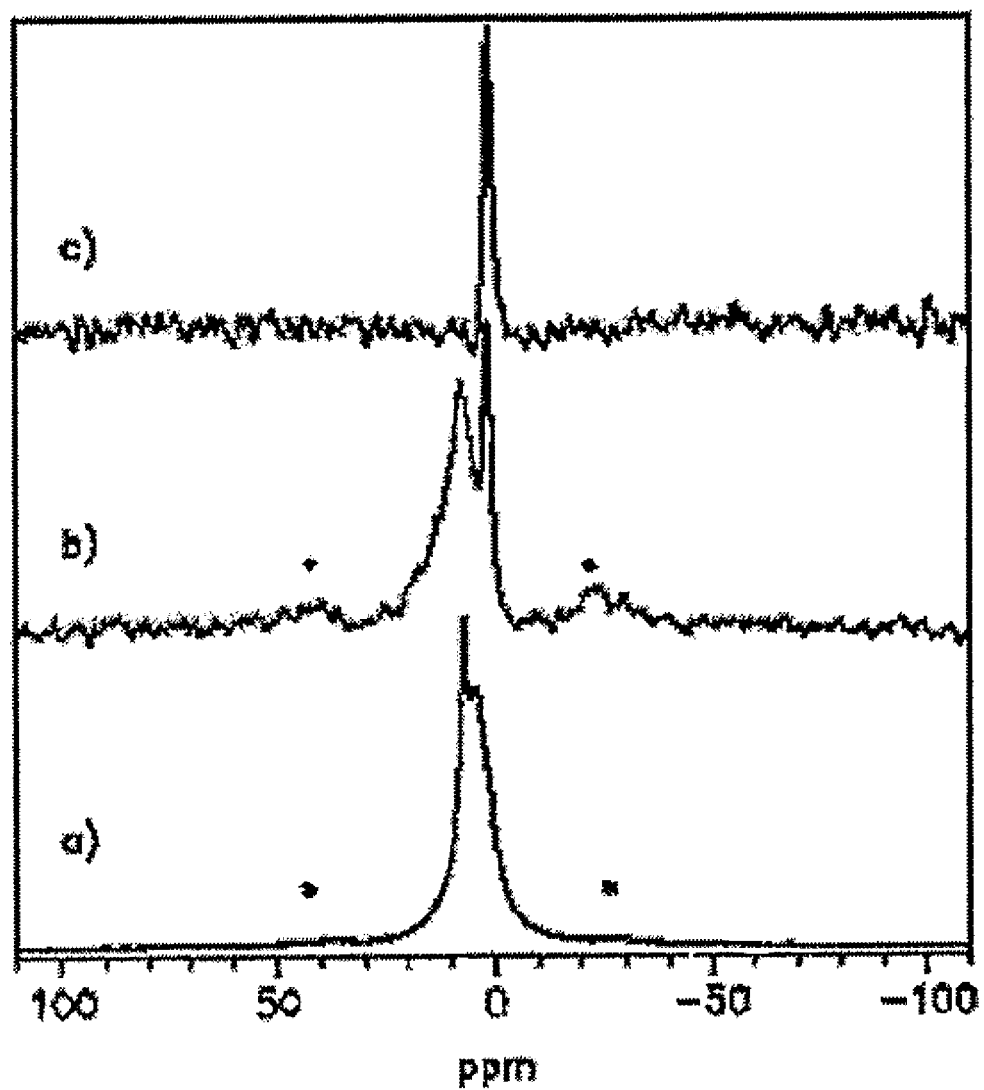

CONDUCTIVE POLYMER-CARBON NANOTUBE COMPOSITE AND MANUFACTURING METHOD THEREOF

The present application is a National Stage application of PCT International Patent Application No. PCT/KR2007/004663 (filed on Sep. 21, 2007) which claims priority to Korean Patent Application No. 10-2006-0092323 (filed on Sep. 22, 2006) which are hereby incorporated by reference in its entirety.

TECHNICAL FIELD

The present invention relates to a conductive polymer-carbon nanotube composite including a carbon nanotube and a conductive polymer filled therein, and a method of manufacturing the same.

BACKGROUND ART

Carbon nanotubes have very anisotropic structures, and may be formed in various shapes such as single-walled, multi-walled and rope shapes. The carbon nanotubes may have conducting or semiconducting characteristics depending on how they are coiled, different energy gaps depending on their chirality and/or diameters, and particular quantum effects due to quasi-one-dimensional structures.

Multifunctional carbon nanotubes having particular structures and properties are widely applied to flat panel display devices, highly-integrated memory devices, secondary batteries and ultra-capacitors, which are key elements in telecommunication devices, and to hydrogen storage materials, chemical sensors, ultra-high strength/ultra-lightweight composite materials, and electrostatic removal composite materials and electronic wave blocking materials, and have potential to overcome shortcomings that conventional devices may have. Thus, various studies on such carbon nanotubes are progressing.

Particularly, in manufacturing a composite by introducing another material into a carbon nanotube, during or after the manufacturing process of the carbon nanotube, a wet-chemical method or a method of introducing metal into a carbon nanotube using supercritical fluids is known (S. Seraphin et al., Nature 362(1993), 503; P. M. Ajayan et al., Phys. Rev. Lett. 72(1994) 11 1722; S. C. Tsang et al., Nature 372 (1994) 159; X. R. Ye et al., Adv. Mater. 15(2003) 316; Z. Sun et al., Adv. Mater. 17(2005) 7 928).

However, a composite encapsulated by filling an organic molecule into a carbon nanotube has not been widely reported, and as an example of such a material, only a "pea-pod" has been studied (B. W. Smith et al., Nature 396(1998) 323).

Recently, it has been discussed that electronic characteristics of the carbon nanotube may be adjusted by filling an organic molecule into a carbon nanotube (J. Lu et al., Phys. Rev. Lett. 93(2004) 11 116804; V. Meunier et al., J. Chem. Phys. 123(2005) 024705), and it has been reported that an organic dopant is capillary-filled into a carbon nanotube (T. Takenobu et al., Nature Materials 2(2003) 683).

Also, characteristics of a polyacetylene chain in a carbon nanotube have been theoretically studied (G. C. McIntosh et al., Phys. Rev. B 67(2003) 125419), and a primary experiment thereon has also been conducted (J. Steinmetz et al., Curr. Appl. Phys. 7(2007) 39-41).

DISCLOSURE

Technical Problem

The present invention is directed to a carbon nanotube composite which overcomes limitations that conventional materials have and thus may be applicable to various industries.

Technical Solution

The present inventor identifies that a conductive polymer-carbon nanotube composite having a conductive polymer filled in a carbon nanotube can be manufactured by filling a monomer of a conductive polymer in a carbon nanotube using supercritical carbon dioxide and polymerizing the monomer, and accordingly completes the present invention.

In one aspect, a conductive polymer-carbon nanotube composite is provided, which includes a carbon nanotube and a conductive polymer filled in the carbon nanotube.

In another aspect, a method of manufacturing a conductive polymer-carbon nanotube composite is provided, which includes the steps of: introducing a monomer of a conductive polymer into an open-ended carbon nanotube using supercritical fluids and polymerizing the monomer to fill the carbon nanotube with the conductive polymer to be encapsulated.

ADVANTAGEOUS EFFECTS

The conductive polymer-carbon nanotube composite according to the present invention is a novel nano-structure material which can overcome limitations that the conventional materials have, and thus can be applied to various industries such as sensors, electrode materials, nanoelectronic materials, and so on.

DESCRIPTION OF DRAWINGS

FIG. 1 shows high-resolution transmission electron microscopy (HRTEM) photographs of poly(N-vinylcarbazole)-carbon nanotube composites (PNVC@NT).
 a: Composite according to Exemplary Embodiment 1
 b: Enlarged photograph of a
 c: Composite according to Exemplary Embodiment 2
 d: Enlarged photograph of c
 e and f: Composites according to Exemplary Embodiment 3

FIG. 2 shows HRTEM photographs of polypyrrole-double-walled carbon nanotube composites (PPy@DWNT) according to Exemplary Embodiment 4.

FIG. 3 shows NMR data.
 a: NMR data of only polypyrrole (PPy)
 b: NMR data of a polypyrrole-double-walled carbon nanotube composite manufactured by polymerization in water
 c: NMR data of a polypyrrole-double-walled carbon nanotube composite manufactured by polymerization in acetonitrile

MODE FOR INVENTION

Hereinafter, a conductive polymer-carbon nanotube composite (hereinafter, referred to as "composite") and a method of manufacturing the same will be described in detail.

The conductive polymer-carbon nanotube composite according to the present invention is manufactured using a supercritical fluid. The supercritical fluid has been widely employed to porous material chemistry and may be easily introduced into an open-ended carbon nanotube due to its low viscosity and surface tension. The supercritical fluid may be supercritical carbon dioxide, but the present invention is not limited thereto. The supercritical carbon dioxide ($scCO_2$) is suitable for manufacturing a conductive polymer-carbon nanotube because it has excellent solvent power and easily accessible critical parameters (Tc=31° C., Pc=73.8 bar) and leaves no trace after pressure release due to its gaseous phase in a standard condition.

The carbon nanotubes are classified into a multi-walled carbon nanotube, a double-walled carbon nanotube and a single-walled carbon nanotube depending on the number of walls, however the present invention is not particularly limited to the kind of carbon nanotube.

According to the present invention, a composite having a conductive polymer filled in a carbon nanotube may be manufactured by introducing various organic materials (e.g., a conductive polymer, etc.) into a nanotube using a supercritical fluid technique, and then polymerizing the materials.

The materials which may be filled in the carbon nanotube include conductive polymers such as polypyrrole and poly(N-vinylcarbazole), but the present invention is not limited thereto. Materials which may be sufficiently small and soluble in supercritical fluids may be filled into the carbon nanotube to manufacture the composite.

In the present invention, an open-ended carbon nanotube and a monomer of a conductive polymer to be filled in the carbon nanotube are put into a reactor, and then a supercritical fluid (e.g., supercritical carbon dioxide) is introduced in a supercritical condition. Here, the supercritical carbon dioxide may be treated by stirring the mixture for several hours at a pressure of about 110 to 150 bar and a temperature of 35 to 50° C.

The monomer soluble in the supercritical fluid is introduced into the nanotube, and then polymerized by an appropriate method depending on the kind of monomer.

An initiator may be needed in the polymerization, which may be a 2,2'-azobisisobutyronitrile (AIBN) initiator, in order to polymerize poly(N-vinylcarbazole). In the polymerization requiring an initiator, an open-ended carbon nanotube, a monomer and an initiator are put into a reactor, and treated with supercritical fluids.

The polymerization methods may include a method which polymerization is performed by applying heat to supercritical carbon dioxide above a decomposition temperature of an initiator, a method which polymerization is performed by heating, a method which polymerization is chemically performed in an oxidant solution, a method which polymerization is electrically performed by applying voltage, and so on.

A poly(N-vinylcarbazole)-carbon nanotube composite may be manufactured by putting an open-ended carbon nanotube, N-vinylcarbazole as a monomer and 2,2'-azobisisobutyronitrile as an initiator in a reactor, impregnating the reactor with supercritical carbon dioxide and performing polymerization in the supercritical carbon dioxide by applying heat above the decomposition temperature of the initiator, or cooling the reactor to below the critical temperature, discharging the supercritical carbon dioxide from the reactor and performing polymerization by applying heat.

A polypyrrole-carbon nanotube composite may be manufactured by putting an open-ended carbon nanotube pyrrole as a monomer into a reactor, impregnating the reactor with supercritical carbon dioxide, and performing polymerization by chemical method performed in an oxidant solution or by electrical method performed by applying voltage. The oxidant solution may include $FeCl_3$ solutions such as a $FeCl_3$ solution in acetonitrile or a $FeCl_3$ solution in water.

In this way, the polymerization may be performed using an appropriate method depending on a monomer. However, depending on the polymerization method, a rate of a conductive polymer filled in a carbon nanotube may vary. Thus, the size of vacant space where a conductive polymer is not filled in the carbon nanotube may also vary.

Particularly, it may be seen from the experimental result using supercritical carbon dioxide that, when the polymerization is performed in supercritical carbon dioxide, a vacant space where a conductive polymer is not filled in a nanotube is smaller compared to the case that the polymerization is performed without supercritical carbon dioxide, that is, the case of lowering a temperature to below a critical temperature before the polymerization and discharging the supercritical carbon dioxide. The reason is that while in the latter case, the supercritical fluid is separated into gaseous and liquid phases, resulting in non-uniform distribution and a larger vacant space because the temperature is below the critical temperature before the polymerization, in the former case such a phenomenon occurs after the polymerization, the polymer is already arranged and thus its effect is small.

Also, in addition to the polymerization method, a diameter of a carbon nanotube and a solubility of a material with respect to the supercritical fluid affect a ratio of vacant space where a conductive polymer is not filled in a nanotube.

When the monomer outside a carbon nanotube is removed before the polymerization, a composite in which almost all conductive polymers are filled in the carbon nanotube may be manufactured.

After completing the polymerization, the obtained composite is purified by re-distribution, filtering and ultrasonification, thereby manufacturing a desired conductive polymer-carbon nanotube composite.

(Exemplary Embodiment)

Hereinafter, the present invention will be described with reference to following embodiments in detail. However, the scope of the present invention is not limited thereto.

A conductive polymer-carbon nanotube composite manufactured in the following embodiment was detected by HRTEM (JEOL JEM-3011) and 1 H MAS NMR (6 kHz, room temperature).

In order to manufacture the conductive polymer-carbon nanotube composite, as described below, an open-ended carbon nanotube was prepared.

Multi-walled carbon nanotubes (MWNT; IljinCNT) and double-walled carbon nanotubes (DWNT; Aldrich, #637351) were prepared. The size of the MWNT was varied, and the average number of walls, which was estimated by x-ray diffraction (XRD), was about 50. A half of the carbon nanotubes obtained from Aldrich were the DWNTs, and the other half were smaller NWNT, whose average number of walls was about 6.

The prepared carbon nanotube was refluxed in concentrated nitric acid, thereby opening an end of the nanotube. After that, the dispersion was cooled down, diluted and then filtered (PTFE membrane filter, pore size: 1 μm). After being washed, the filtered product was re-dispersed in a KOH solution using a sonicator, filtered with deionized water, and then washed again. After being dried, the filtered product was finely powdered.

Exemplary Embodiment 1:

Manufacture of Poly(N-carbazole)-carbon Nanotube Composite (PNVC@MWNT) (1)

40 mg of open-ended multi-walled carbon nanotube, which was prepared by the above method, 0.5 g of N-vinylcarbazole monomer (Aldrich) and 0.005 g of 2,2'-azobisisobutyronitrile initiator (Junsei Chemical) were put into a 30 ml high pressure reactor equipped with a pressure gauge, a thermometer and a magnetic stirrer. The mixture was heated to 40° C., impregnated with supercritical carbon dioxide under 150 bar, and stirred for 2 to 4 hours.

After impregnation, the reactor was adjusted to 70° C., 300 bar, and polymerization was performed in the supercritical carbon dioxide. After that, the polymerized product was purified by being dispersed again in THF, treated with ultrasonic waves and filtered to manufacture poly(N-vinylcarbazole)-multi-walled carbon nanotube composite (PNVC@MWNT).

The manufactured PNVC@MWNT was observed by HRTEM, and the result is shown in FIG. 1 (photographs a and b). It may be seen from FIG. 1 that the PNVC@MWNT having poly(N-vinylcarbazole) filled in the carbon nanotube was generated.

Exemplary Embodiment 2:
Manufacture of Poly(N-vinylcarbazole)-multi-walled Carbon Nanotube Composite (PNVC@MWNT) (2)

40 mg of open-ended multi-walled carbon nanotube, which was prepared by the above method, a 0.5 g of N-vinylcarbazole monomer (Aldrich) and a 0.005 g of 2,2'-azobisisobutyronitrile initiator (Junsei Chemical) were put into a 30 ml high pressure reactor equipped with a pressure gauge, a thermometer and a magnetic stirrer. The mixture was heated to 40° C., impregnated with supercritical carbon dioxide under 150 bar, and stirred for 2 to 4 hours.

The reactor was cooled down to below a critical temperature, and pressure was slowly reduced over several hours. After the nanotube was dispersed in THF and filtered, the filtered product was washed a couple of times with THF to remove an excessive amount of monomers from outside of the nanotube. The nanotube was put into a 90° C. oven overnight and polymerized. After that, the polymerized product was purified by being dispersed again in THF, treated with ultrasonic waves and filtered to manufacture poly(N-vinylcarbazole)-multi-walled carbon nanotube composite (PNVC@MWNT).

The manufactured PNVC@MWNT was observed by HRTEM, and the result is shown in FIG. 1 (photographs c and d). It may be seen from FIG. 1 that the PNVC@MWNT having poly(N-vinylcarbazole) filled in the carbon nanotube was generated.

As compared to the PNVC@MWNT generated in Exemplary Embodiment 1, the PNVC@MWNT generated in Exemplary Embodiment 2 had a larger space where poly(N-vinylcarbazole) was filled in the nanotube. As described above, the difference resulted from the polymerization methods thereof. That is, in this exemplary embodiment, since the reactor was cooled down to below the critical temperature after the treatment with supercritical carbon dioxide, the supercritical carbon dioxide was separated into gaseous and liquid phases to be non-uniformly distributed, and thus had a large space where poly(N-vinylcarbazole) was not filled in the carbon nanotube.

Also, the PNVC@MWNT manufactured in this exemplary embodiment was subjected to removal of monomers from the outside of the carbon nanotube before polymerization, and therefore an amount of poly(N-vinylcarbazole) outside the carbon nanotube was smaller than PNVC@MWNT generated in Exemplary Embodiment 1.

Exemplary Embodiment 3:
Manufacture of Poly(N-vinylcarbazole)-double-walled Carbon Tube Composite (PNVC@DWNT)

Except for the use of the double-walled carbon nanotube, the poly(N-vinylcarbazole)-double-walled carbon tube composite (PNVC@DWNT) was manufactured by the same method as Exemplary Embodiment 1.

The manufactured PNVC@DWNT was observed by HRTEM, and the result is shown in FIG. 1 (photographs e and f). It can be seen from FIG. 1 that the PNVC@DWNT where poly(N-vinylcarbazole) was filled in a carbon nanotube was generated.

Exemplary Embodiment 4:
Manufacture of Polypyrrole-double-walled Carbon Nanotube Composite (PPy@DWNT)

50 mg of open-ended double-walled nanotube which was prepared as described above and a 1 g pyrrole monomer (Aldrich) were put into a 30 ml reactor. The mixture was heated to 40° C., and the reactor was impregnated with supercritical carbon dioxide at 120 bar. In such a condition, the dispersion was stirred for 4 hours, and a reactor was cooled down to discharge the carbon dioxide. The carbon nanotube impregnated with monomers was dispersed in deionized water, and filtered using a PTFE membrane filter. The nanotube was stirred in with a 0.25M $FeCl_3$ solution in acetonitrile or a 2.25M $FeCl_3$ solution in water, and then polymerized pyrrole. The polymerized product was filtered and purified by re-dispersing it sequentially in deionized water, concentrated hydrochloride solution, deionized water, KOH solution and deionized water. Accordingly, the polypyrrole-double-walled carbon tube composite (PPy@DWNT) was manufactured.

The HRTEM photograph of the manufactured PPy@DWNT is shown in FIG. 2. It can be seen from FIG. 2 that PPy@DWNT where polypyrrole was filled in the double-walled carbon nanotube was generated.

Also, it can be further seen that the PPy@DWNT was generated by 1 H MAS NMR of the PPy@DWNT generated above, and the result is shown in FIG. 3.

Graph a of FIG. 3 shows NMR data of only polypyrrole (PPy), and graph b shows NMR data of a polypyrrole-double-walled carbon tube composite manufactured by performing polymerization in water, and graph c shows an NMR data of a polypyrrole-double-walled carbon tube composite manufactured by performing polymerization in acetonitrile. It can be seen from the result that when the polymerization was performed in water or acetonitrile, the polypyrrole was filled in a carbon nanotube at all cases. However, when the polymerization was performed in acetonitrile, the result was more excellent. That is, it can be seen from FIG. 3 that polypyrrole exists in and outside the nanotube when the polymerization was performed in the water (i.e., polypyrrole+polypyrrole-double-walled carbon tube composite), whereas almost all the polypyrrole was filled in the nanotube when the polymerization was performed in acetonitrile (i.e., polypyrrole-double-walled carbon tube composite).

While the invention has been shown and described with references to certain exemplary embodiments thereof, it will be understood by those skilled in the art that various changes in form and details may be made therein without departing from the spirit and scope of the invention as defined by the appended claims.

The invention claimed is:

1. A method of manufacturing a conductive polymer-carbon nanotube composite, comprising the steps of:
   introducing a monomer of a conductive polymer into an open-ended carbon nanotube using a supercritical fluid; and
   polymerizing the monomer to fill the carbon nanotube with the conductive polymer.

2. The method according to claim 1, wherein the conductive polymer comprises one chosen from the group consisting of poly(N-vinylcarbazole) and polypyrrole.

3. The method according to claim 1, wherein the supercritical fluid comprises supercritical carbon dioxide, and is introduced under conditions of a pressure of 110 to 150 bar and a temperature of 35 to 50° C.

4. The method according to claim 2, wherein the supercritical fluid comprises supercritical carbon dioxide, and is introduced under conditions of a pressure of 110 to 150 bar and a temperature of 35 to 50° C.

5. The method according to claim 1, wherein the conductive polymer comprises poly(N-vinylcarbazole), and polymerization is performed by using an initiator in supercritical carbon dioxide.

6. The method according to claim 5, wherein the initiator comprises 2,2'-azobisisobutyronitrile.

7. The method according to claim 1, wherein the conductive polymer comprises poly(N-vinylcarbazole), and polymerization is performed by heating.

8. The method according to claim 1, wherein the conductive polymer comprises polypyrrole, and polymerization is chemically performed in an oxidant solution.

9. The method according to claim 8, wherein the oxidant solution comprises a $FeCl_3$ solution.

10. The method according to claim 1, wherein the conductive polymer comprises polypyrrole, and polymerization is performed electrically by applying voltage.

11. The method according to claim 1, further comprising the step of:

removing the monomer outside the carbon nanotube before polymerization.

* * * * *